United States Patent
Keller et al.

[11] Patent Number: 6,093,237
[45] Date of Patent: Jul. 25, 2000

[54] STACK FILTER ASSEMBLY AND METHODS

[75] Inventors: Scott A. Keller, Savage; Kirk A. Schneider, Eden Prairie; Todd G. Carey, Farmington; David G. Ferris, Mahtomedi, all of Minn.

[73] Assignee: Donaldson Company, Inc., Minneapolis, Minn.

[21] Appl. No.: 09/090,291

[22] Filed: Jun. 4, 1998

[51] Int. Cl.[7] .................................................. B01D 46/00
[52] U.S. Cl. ............................. 95/287; 96/421; 96/138; 55/476; 55/480; 55/486; 55/488; 55/498; 55/506; 55/492; 55/510; 55/518
[58] Field of Search .......................... 55/476, 480, 486, 55/485, 498, 502, 503, 505, 510, 518, 482, 506, 492, 488; 96/134, 138, 400, 402, 421; 95/287, 901

[56] References Cited

U.S. PATENT DOCUMENTS

| | | |
|---|---|---|
| 3,350,860 | 11/1967 | Grassel et al. . |
| 3,857,688 | 12/1974 | Wisnewski ................................ 55/498 |
| 4,256,474 | 3/1981 | Berger et al. . |
| 4,322,230 | 3/1982 | Schoen . |
| 4,332,679 | 6/1992 | Hergst et al. . |
| 4,491,460 | 1/1985 | Tokar . |
| 4,498,914 | 2/1985 | Ericksen . |
| 4,681,677 | 7/1987 | Kuh et al. . |
| 4,692,175 | 7/1987 | Frantz ........................................ 55/486 |
| 4,720,292 | 1/1988 | Engel et al. . |
| 5,042,997 | 8/1991 | Rhodes ..................................... 96/400 |
| 5,047,072 | 9/1991 | Wertz et al. . |
| 5,082,476 | 1/1992 | Kahlbaugh et al. . |
| 5,167,683 | 12/1992 | Behrendt et al. ......................... 55/498 |
| 5,238,474 | 8/1993 | Kahlbaugh et al. . |
| 5,364,456 | 11/1994 | Kahlbaugh et al. . |
| 5,423,892 | 6/1995 | Kahlbaugh et al. . |
| 5,547,480 | 8/1996 | Coulonvaux . |
| 5,613,992 | 3/1997 | Engel . |
| 5,653,870 | 8/1997 | Tsuchiya et al. ......................... 55/503 |
| 5,690,712 | 11/1997 | Engel . |
| 5,693,109 | 12/1997 | Coulonvaux . |

FOREIGN PATENT DOCUMENTS

| | | |
|---|---|---|
| 802281 | 10/1958 | United Kingdom . |
| 2035833 | 6/1980 | United Kingdom ..................... 55/485 |
| WO 98/21492 | 5/1998 | WIPO . |

OTHER PUBLICATIONS

Declaration of Scott Keller dated Oct. 21, 1998 with Exhibit A (The Assembly depicted being publicty disclosed in 1996).

*Primary Examiner*—David A. Simmons
*Assistant Examiner*—Robert A. Hopkins
*Attorney, Agent, or Firm*—Merchant & Gould P.C.

[57] ABSTRACT

An air cleaner arrangement useful for cleaning air in ablative thermal imaging processes includes a housing and a removable and replaceable element assembly. The housing has an interior, an inlet conduit, and an outlet conduit. The element assembly includes first and second filter elements axially aligned and secured together in a stack configuration. The first filter element has a media pack for filtering particulate material. The second filter element has a media pack for filtering noxious gases, such as formaldehyde. In operation, a blower assembly directs airflow through the inlet conduit, into the first element interior, through the first element media pack, through the second element media pack, into the second element interior, and out through the housing outlet conduit. Methods for filtering and changing out of the element assembly are also described herein.

20 Claims, 10 Drawing Sheets

STACK FILTER ASSEMBLY AND METHODS

FIELD OF THE INVENTION

This invention concerns filtration arrangements and methods. In one specific application, this invention concerns a filtration arrangement and method for removing particulates and gases given off during ablative thermal imaging processes.

BACKGROUND OF THE INVENTION

In certain types of printing processes, an image is captured on a film through a photographic technique. Chemical solutions are applied to the film to develop and burn the image into a plate. The plate is then used in a printing press. This type of printing process is increasingly being replaced with computer-to-plate (CTP) technology.

In CTP technology, an image is captured digitally. The digital image is transmitted to a laser that acts on a film. The film typically has a dye coating laminated to a plastic film. Such films are sold commercially by Kodak and DuPont, for example. The laser burns or ablates the dye coating off to form the image. The film with the image is then exposed and imprinted onto a plate. The plate is then used in a printing press. This process is also referred to as an ablative thermal image process.

When the laser burns the dye coating on the film, certain gases and contaminants or particulates are given off. The gases may include formaldehyde, for example, or odors such as sulfur. It is desirable to clean the air in the vicinity of CTP technology.

SUMMARY OF THE INVENTION

A filter arrangement is provided including first and second media constructions. The first and second media constructions preferably are stacked in axial alignment. The first media construction preferably operates to remove particulates from an airflow stream. The second media construction preferably operates to remove odors or gasses from an airflow stream. Preferably, the second media construction is positioned to be downstream of the first media construction.

Preferably, the first media construction has first and second opposite end caps and an open filter interior. The first end cap preferably has an airflow aperture in airflow communication with the open filter interior, while the second end cap is closed to airflow therethrough. Preferably, the second media construction has first and second opposite end caps and defines an open filter interior. Preferably, the first end cap of the second media construction is closed to airflow therethrough and is adjacent to the second end cap of the first media construction. Preferably, the second media construction's second end cap has an airflow aperture in airflow communication with the second media construction open filter interior.

In one preferred arrangement, the airflow stream to be filtered is directed into the open filter interior of the first media construction, through the first media, through the second media, into the open filter interior of the second media construction, and out through the airflow aperture in the second media construction's second end cap.

In certain preferred embodiments, the filter element arrangement is oriented within a housing. Preferably, a sealing system is used to provide an airtight seal between the element arrangement and the housing. Such sealing systems can include axial sealing systems or radial sealing systems.

Methods for filtering and for changing a filter element assembly are provided. Preferred methods may use certain of the preferred arrangements as described herein.

DETAILED DESCRIPTION OF THE PREFERRED EMBODIMENTS

I. Some Problems With Existing Arrangements

Filtration systems have been used in the past in connection with ablative thermal imaging processes. Such systems have typically included an element open on both ends, comprising a particulate filter media radially inside of a carbon filter media. The filter element was secured to the housing through a central yoke and wing nut. Air was directed into the housing inlet, into the interior of the particulate filter, through the particulate filter media, through the carbon filter media, and out through an outlet in the housing. The outlet was typically positioned on the side of the housing. There was no method of determining if the filter element needed to be replaced, or if the filter element was not installed in the housing assembly.

This arrangement presented problems. For example, the relative orientation of the airflow outlet on the side of the housing sometimes caused non-uniform flow through the filtering media. Further, to replace the filter element required the removal of the wing-nut and cover. The wing-nut constituted a loose part which could be dropped inside of the housing or lost during filter change out.

In addition, the orientation of the particulate filter radially upstream of the carbon filter sometimes lead to loading problems. For example, as the particulate filter media loaded, the resulting airflow through the carbon filter media downstream of the particulate filter media became altered and less uniform. That is, the carbon filter media immediately downstream of a loaded portion of the particulate filter media would not receive as much airflow therethrough. Thus, the airflow would be diverted to other regions of the carbon filter media and become more worn than the region of carbon filter media immediately adjacent to and downstream of the loaded particulate filter media.

Further, because the filter element had openings on both ends, there were problems during change out or servicing of the system. During change out, the collected particulate matter could fall out through the openings into the housing or into other undesirable places.

The arrangements and methods described herein help to solve these and other problems.

II. The Arrangements of FIGS. 1–10

A. Overview of System

Figure 1:
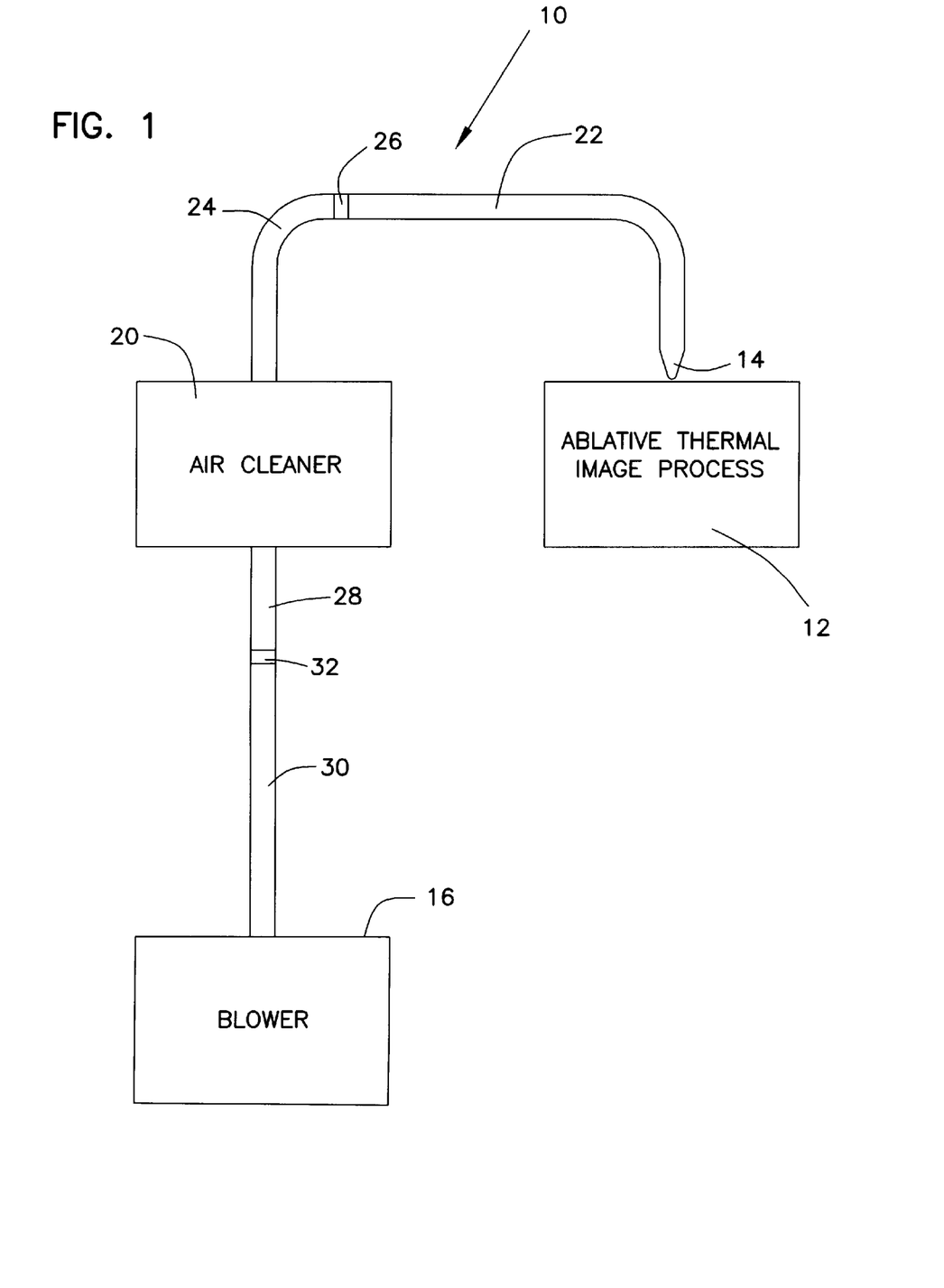
FIG. 1 is a schematic illustration of one embodiment of an air cleaner system, in accordance with principles of the present invention.

In reference now to FIG. 1, an air cleaner system is shown schematically at 10. In FIG. 1, a process that produces particulates and noxious gases as by-products is shown generally at 12. Process 12 can be, for example, an ablative thermal image process. Such processes typically produce particulates within the size range of 0.1 micron and greater and can include sulfur, silica, carbon, aluminum, phosphorous, and/or zinc, depending on the film used. These processes may also produce gases such as formaldehyde in the quantity of 0.5–7.5 parts per million, at room temperature (about 72° F.), depending on the flow rate. If the flow rate drops, the concentration of gases, such as formaldehyde, increases.

Typically, structure is oriented close to the process 12, in order to direct the air in the vicinity of the process through the air cleaner 20. This can be done by a hood or a nozzle 14 in the vicinity of the process 12. A blower 16 induces vacuum pressure through the air cleaner and upstream to the region of the nozzle 14, in order to draw the particulates and fumes into the air cleaner 20. The particulates and fumes are drawn in, then, by the vacuum pressure into a conduit, such as a flexible hose 22. The hose 22 is in fluid communication (i.e., airflow communication) with an inlet conduit 24. The hose 22 and inlet conduit 24 may be sealed together by any suitable means, such as a hose clamp 26.

From the inlet conduit 24, the air containing the particulates and noxious gases is directed into the air cleaner 20. The air cleaner 20 removes at least about 90% and typically at least 95% of all particulates having a size greater than 0.5 micron, and removes at least 90% and typically at least 98.7% of the formaldehyde gases from the air. The purified air is then drawn through an outlet conduit 28, where it is eventually directed through the blower 16 and into the atmosphere. A hose 30 may typically be used to connect the outlet conduit 28 to the blower 16. Again, a hose clamp 32 can be used to provide for a secure seal between the outlet conduit and the hose 30.

Figure 2:
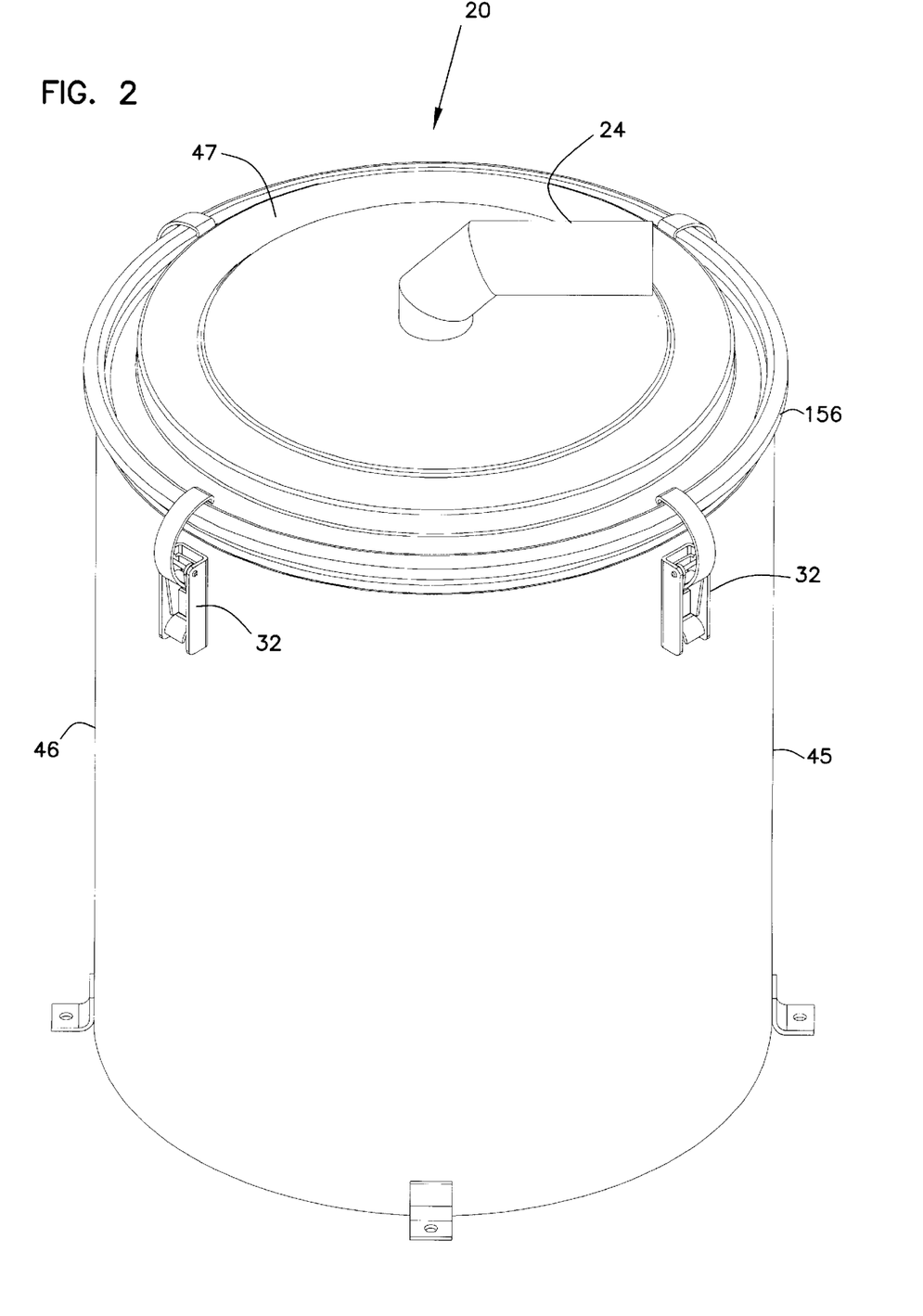
FIG. 2 is a perspective view of one embodiment of an air cleaner, according to principles of the present invention.

Turning now to FIG. 2, the air cleaner 20 is shown in perspective view. In general, air cleaner 20 includes a housing 45 with a body 46 and a removable cover 47. Inlet conduit 24 can be seen passing through the cover 47.

Figure 3:
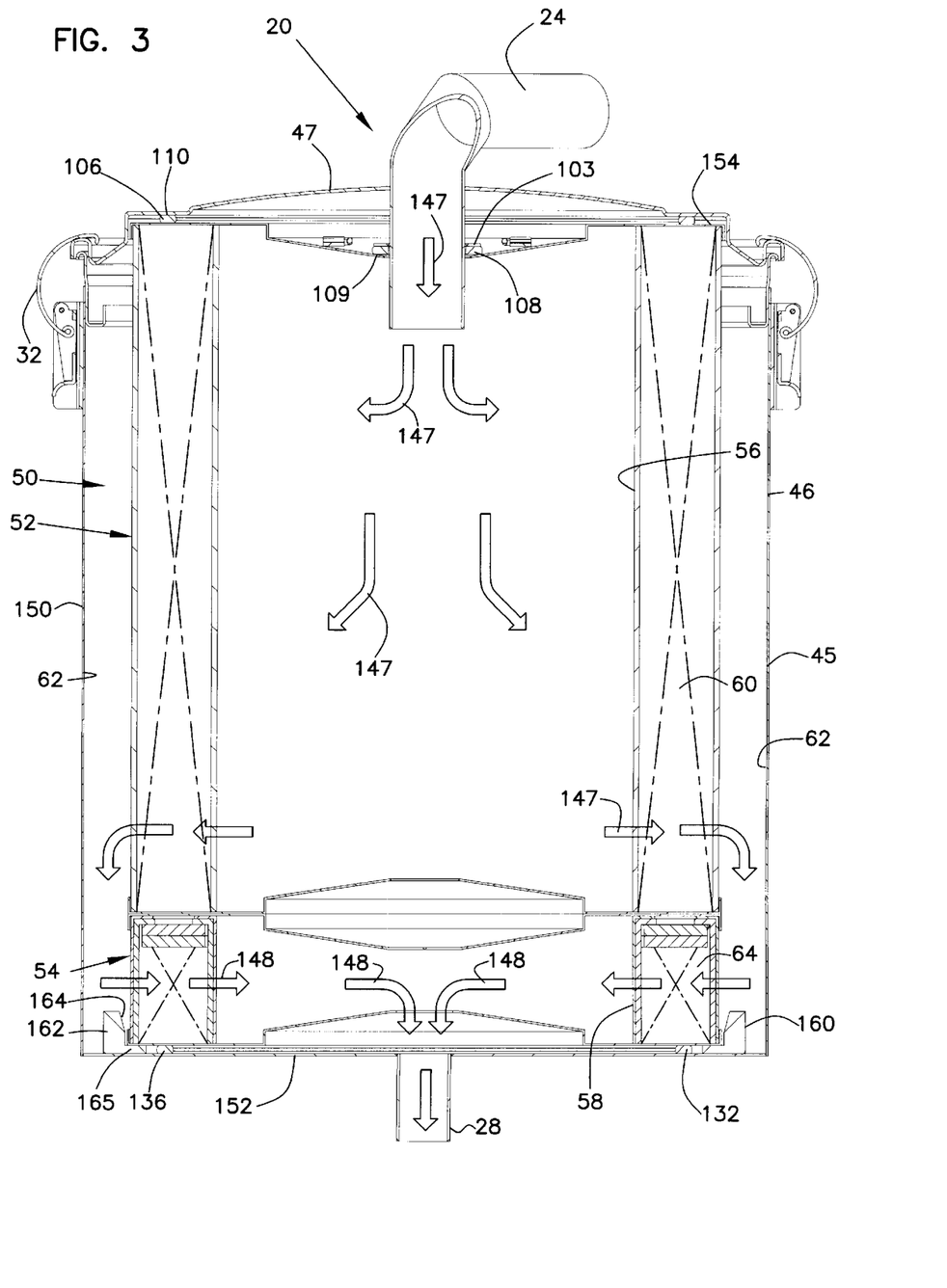
FIG. 3 is a cross-sectional view of the air cleaner depicted in FIG. 2, and showing an element assembly oriented therein.

Attention is now directed to FIG. 3. FIG. 3 depicts a cross-sectional view of the air cleaner 20. As can be seen in FIG. 3, air cleaner 20 includes the housing 45 holding or containing within it an element assembly 50. Preferably, element assembly 50 includes a first element 52 secured in axial alignment and stacked on top of a second element 54. Note that inlet conduit 24 is shown extending and projecting through cover 47 and into an open filter interior 56 of the first element 52. Note also that outlet conduit 28 is shown extending from housing body 46 and in airflow communication with an open filter interior 58 of the second element 54.

In general, in operation of the air cleaner 20, the air containing the particulates and noxious gases preferably is drawn through the inlet conduit 24, into the open filter interior 56 of the first element 52, through the media 60 of the first element 52, and into the channel 62 between the housing 45 and the element assembly 50. Preferably, the first element 52 operates to remove particulates from the air stream. From the channel 62, the air stream preferably is directed through the media 64 of the second element 54, and into the open filter interior 58. The media 64 of the second element 54 preferably operates to remove noxious gases, such as formaldehyde, from the air stream. From the open filter interior 58, the purified air flows through the outlet conduit 28, and eventually through blower 16 to the atmosphere.

B. Element assembly 50

Figure 4:
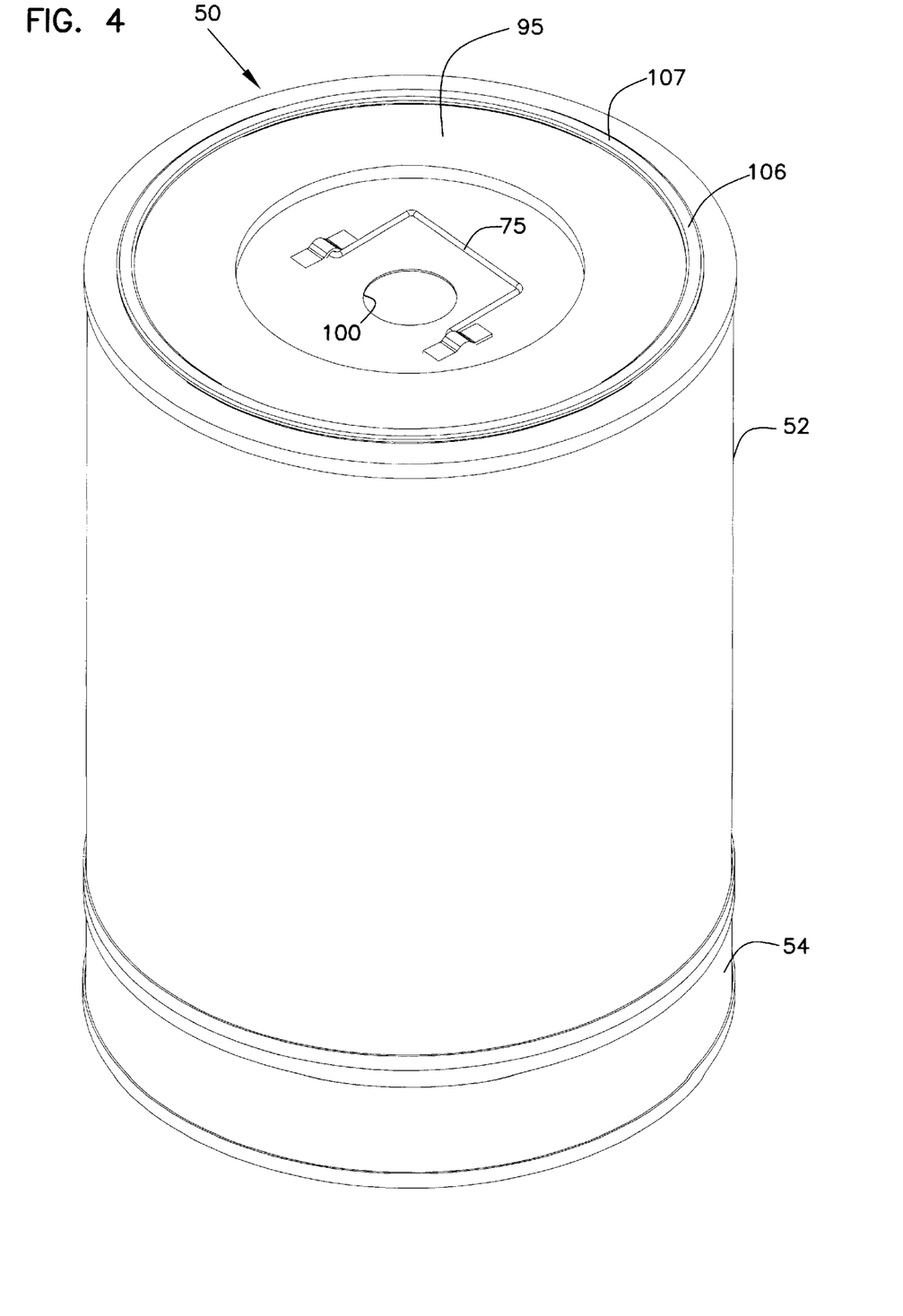
FIG. 4 is a perspective view of one embodiment of an element assembly usable in the air cleaner depicted in FIG. 2, in accordance with principles of the present invention.

Attention is now directed to FIG. 4. In FIG. 4, one preferred element assembly 50 is shown in perspective view. As can be seen, element assembly 50 preferably includes a cylindrical arrangement comprising the first element 52 axially aligned and stacked to second element 54. The element assembly 50 is removable and replaceable within housing 45. As depicted in FIG. 4, the element assembly 50 preferably includes a handle 75 operably connected thereto. The handle 75 helps to remove and orient the element assembly 50 relative to the housing 45.

The first and second elements 52, 54 are secured together and stacked in axial alignment. By "stacked in axial alignment", it is meant that the first and second filter elements 52, 54 are axially aligned, in that they preferably share a common central axis 78 (FIG. 5), but they are not radially aligned. Rather, they are stacked, one on top of the other, if oriented vertically as in the illustration shown in FIGS. 4 and 5.

By "removable and replaceable", it is meant that the element assembly 50 can be taken out of the housing 45 without destruction of the housing 45. The element assembly 50 may then be replaced with a new, unused element assembly, which is oriented within the housing 45 for operation. The old element assembly 50 may be discarded or recycled, as appropriate.

In the preferred embodiment shown, the element assembly 50 comprises the first element 52 secured and stacked upon the second element 54. Preferably, the first and second elements 52, 54 are secured together by spot welding the element end caps to each other. That is, the second end cap 96 (FIG. 5) of the first element 52 is spot welded to the first end cap 120 (FIG. 5) of the second element 54.

Figure 5:
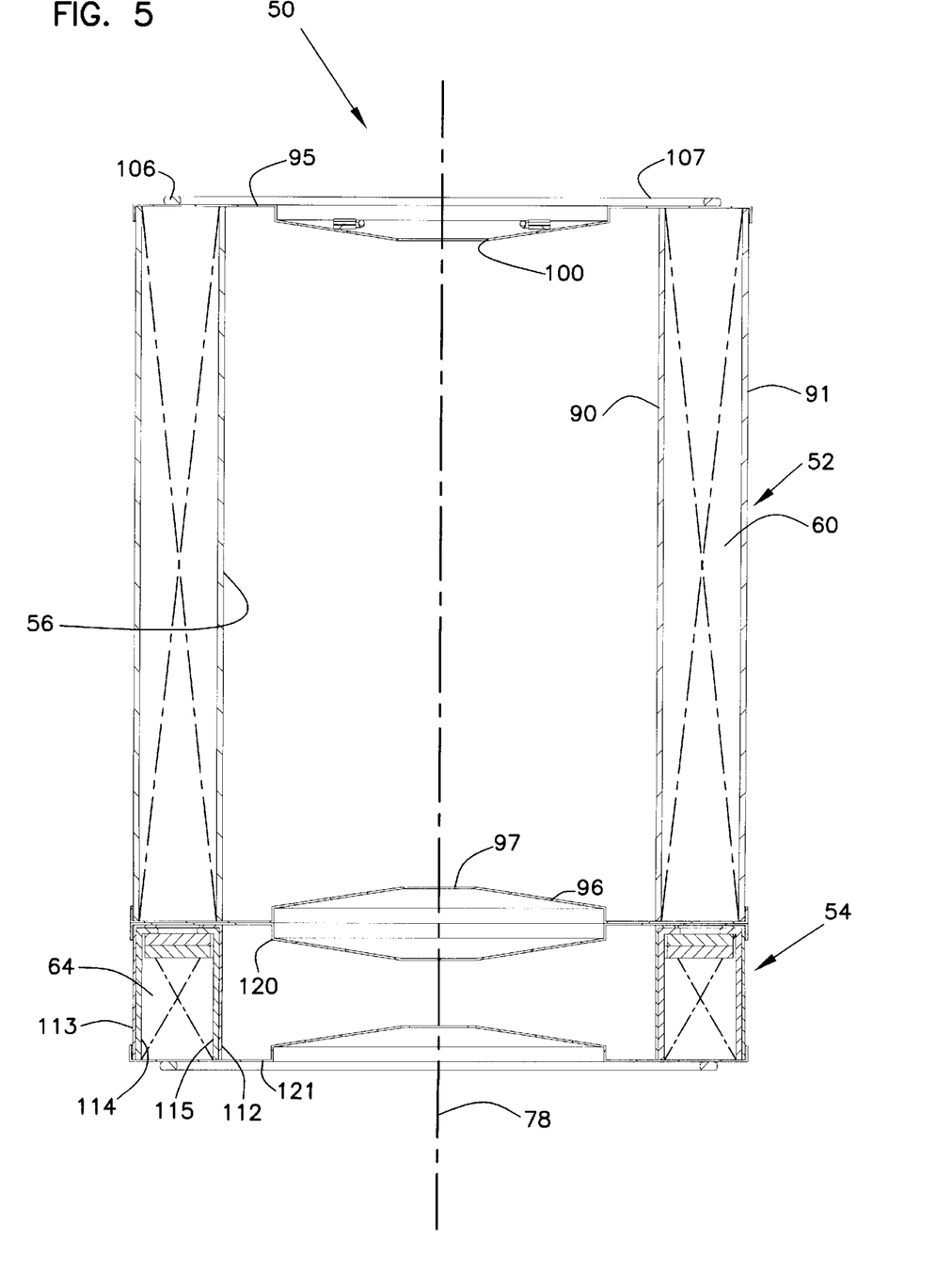
FIG. 5 is a cross-sectional view of the element assembly depicted in FIG. 4, and showing a first filter element stacked adjacent to a second filter element.

Attention is directed to FIG. 5. In FIG. 5, the element assembly 50 is shown in cross-section. Preferably, the first element 52 is cylindrical and includes inner and outer liners 90, 91 for supporting the filtering media 60. The inner and outer liners 90, 91 may include a variety of materials to provide the rigid support structure. This can include expanded metal, perforated metal, and plastic liners, as examples. In general, the inner and outer liners 90, 91 should preferably be selected of materials appropriately perforated or otherwise made porous so as not to substantially interfere with airflow through the arrangement, and be of appropriate structural rigidity and strength to contain the media construction and provide the arrangement with sufficient axial strength for the use intended and to protect the media constructions from damage. Typical liners will have an open area of at least fifty percent, often sixty percent or more. Galvanized metal or plastic arrangements are typically preferred.

At opposite ends of the filter element 52 are preferably first and second opposite end caps 95, 96. In the preferred arrangement shown, the media 60, inner liner 90, and outer liner 91 extend between the end caps 95, 96 and are secured thereto. The particular preferred arrangements shown utilizes end caps 95, 96 formed from metal material, with the media 60 and liners 90, 91 secured to the end caps 95, 96 by potting material such as polyurethane or epoxy.

Still referring to FIG. 5, it is noted that second end cap 96 is a "closed" end cap. That is, end cap 96 includes no airflow apertures therein, so, in general, air is prevented from flowing through end 97 from interior 56 to the channel 62 (FIG. 3).

In contrast, first end cap 95 is an "open" end cap, having a central aperture 100 therein. In use, first filter element 52 is secured within air cleaner 20 with aperture 100 circumscribing inlet conduit 24 (FIG. 2). As a result of appropriate sealing (by way of a variety of possible manners) for designs such as the one shown in FIGS. 3 and 4, airflow is inhibited from reaching channel 62 without filtering first through the media 60.

For the arrangement shown in FIG. 4, preferably the sealing system includes an axial sealing system. In particular, a gasket member 106, for example, an O-ring 107 is mounted on the first end cap 95 and circumscribes the aperture 100. The O-ring 107 is compressed within the housing 45, preferably by the cover 47, to form a seal 110 (FIG. 3) therebetween. While a variety of materials can be used for O-ring 107, preferably neoprene EPDM SBR sponge rubber material is used. This material is more fully described below. In addition, as shown in FIG. 3, a gasket 108 can be secured to the inlet conduit 24 via a plate 103 to provide some sealing at seal 109 between the inlet conduit 24 and the first end cap 95. It should be understood, however, that the axial sealing system of gasket member 106 is the main sealing system relied upon, in preferred arrangements.

Figure 10:
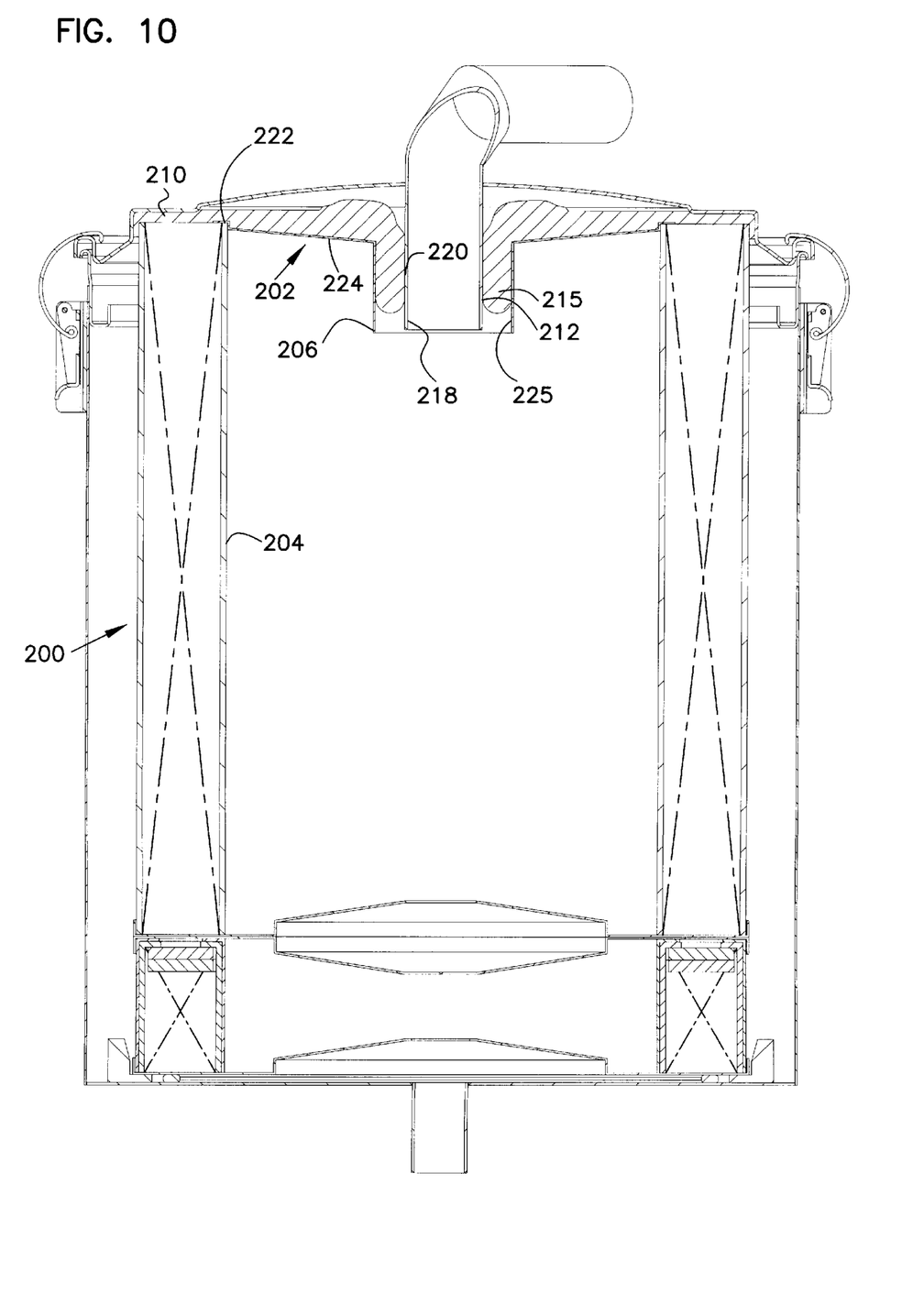
FIG. 10 is a cross-sectional view of an alternate embodiment of an air cleaner analogous to the view shown in FIG. 3, and showing a radial sealing system.

In alternative embodiments, a radial seal can be used between the inlet conduit 24 and the aperture 100. One suitable radial sealing arrangement is described more fully in European Patent 0 329659 B1, incorporated herein by reference. FIG. 10 shows one example embodiment of a radial sealing arrangement. This is discussed below, in conjunction with FIG. 10.

Preferably, the first filter element 52 operates as a particulate filter, that is, the first element 52 removes particles such as sulfur, silica, carbon, aluminum, phosphorous, and/ or zinc to improve the quality of the imaged film or plate in process 12 (FIG. 1). The media 60 is preferably a pleated media, but other alternatives are contemplated. A description of an example preferred material for media 60 is described further below.

As airflows through the inlet conduit 24 and into the filter interior 56 carrying the particles and noxious gases, it passes through the media 60. Preferably, the media 60 removes particles having a size greater than about 0.5 micron. It can be appreciated that the particulates and contaminants are collected on the interior surface of the media 60. In this way, as particulates are collected and buildup, they remain within the filter interior 56. This aids in convenient and clean disposal, when changing out the element assembly 50. Because the end cap 96 is a closed end cap, the collected particulate matter stays within the interior 56 of the element 52, during change out.

Still in reference to FIG. 5, the second filter element 54 is shown preferably in axial alignment with and stacked below the first element 52. As can be seen in FIG. 5, the second element 54 is preferably cylindrical in shape, having an outer diameter equal to the outer diameter of the cylindrical first filter element 52. The second filter element 54 preferably has an axial length considerably shorter than the axial length of the first filter element 52. This is because, in preferred arrangements, the amount of media 64 needed to absorb the noxious odors and gases is not as much as the media 60 needed to remove the particulates. Preferably, the second filter element 54 is oriented downstream of the first filter element 52. In this manner, after the air has passed through media 60 and has had the particulates removed, the air then passes through the media 64 in the second filter element 54, in order to remove the noxious gases, such as formaldehyde.

The second filter element 54 preferably includes a cylindrical inner liner 112 and a cylindrical outer liner 113 for supporting the media 64. Preferably, media 64, inner liner 112, and outer liner 113 extend between first and second end caps 120, 121. Lining the inner liner 112 is a media-containment inner liner 114, in preferred systems. Similarly, lining the outer liner 113 is a media-containment outer liner 115. Media containment liners 114 and 115 also preferably extend between the first and second end caps 120, 121. Inner and outer media containment liners 114, 115 preferably operate to help hold or contain the media 64, for example, granular carbon and carbon dust, within the arrangement. That is, liners 114 and 115 help to keep media 64 from falling through the liners 112, 113 into either the filter interior 58 or outside of the element assembly 50 altogether. Media containment liners 114, 115 are preferably an electrostatic felt. One usable material is described in further detail below.

First end cap 120 is preferably a closed end cap. That is, first end cap 120 includes no airflow apertures therein, so in general, air is prevented from flowing through first end cap 120 to the interior volume 58. In contrast, the second end cap 121 is preferably an open end cap, having central aperture 125 therein (see FIG. 6).

Preferably, the second element 54 operates to remove noxious fumes or odors from the air. The media 64 is selected based upon the types of gases or odors to be removed from the air. Preferably, the second element 54 acts an absorbent or adsorbent. As used herein, the terms "absorbent" and "adsorbent" should be considered to mean the same. Typically, the second element 54 will be a chemical absorbent. In certain preferred systems, the second element 54 will be a particulate chemical absorbent media While a variety of media constructions may be used and are contemplated herein, in the preferred embodiment, media 64 includes activated carbon. A further description of example preferred media 64 is described further below.

Preferably, the first and second end caps 120, 121 are formed from a metal such as 18 gage galvanized steel material, with the liners 112, 113 and media 64 secured thereto by potting, for example polyurethane or epoxy.

Figure 9:
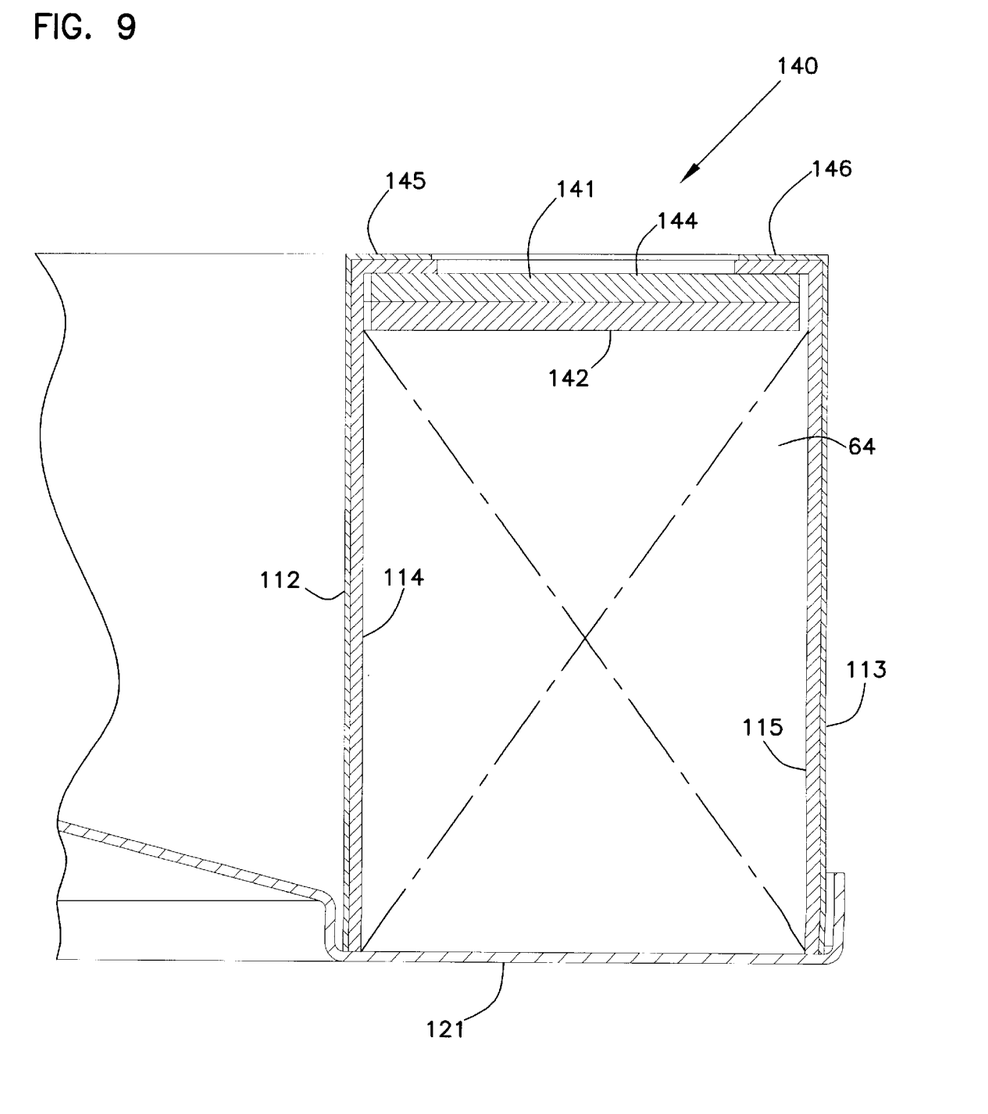
FIG. 9 is a fragmented, enlarged, cross-sectional view of the second filter element depicted in FIG. 5, in accordance with principles of the present invention.

In certain preferred constructions, an arrangement is used to provide for containment and packing of the media 64. In other words, if the media 64 is selected to be a granular or loose particulate chemical absorbent, such as an activated carbon, the arrangement herein provides one example, preferred system for ensuring that the loose, particulate media 64 remains in a packed, tight condition. Attention is directed to FIG. 9. FIG. 9 is a fragmented, enlarged, cross-sectional view of the second element 54. FIG. 9 depicts one preferred packing construction, generally at 140. In the example shown, packing construction 140 includes a plate, lid, or cap 141 and a compressible gasket member 142. Preferably, lid 141 is a cylindrical disk 144 constructed of a nonporous, rigid material, such as plastic. Preferably, gasket member 142 is a soft, compressible material having the same cylindrical shape as the second element 54. One usable material for gasket member 142 is rubber such as neoprene, and is described more fully below.

Still in reference to FIG. 9, note that the inner liners 112 and 114 are preferably folded or bent or crimped over the lid 141 at region 145. Analogously, note that outer liners 113, 115 are folded, or bent, or crimped over lid 141 at region 146. Crimped or bent portions 145, 146, then, are trapped between first end cap 120 and lid 141.

To assemble the second element 54, the second end cap 121 preferably is attached to the inner liners 112, 114 and the outer liners 113, 115 by epoxy or glue. Next, the media 64, such as carbon particulate, preferably is filled between the inner liners 112, 114 and the outer liners 113, 115. The compression gasket 142 is placed on top of the media 64. The plate or lid 141 is positioned on top of the compression gasket 142. Next, preferably, the inner liners 112, 114 are crimped over the lid 141 to form region 145. The outer liners 113, 115 are preferably crimped or bent over the lid 141 to form region 146.

It should be appreciated that the compression gasket 142 operates to ensure tight packing of the media 64. For example, if activated carbon is used as the media 64, the media 64 may settle over time after initial assembly. As the particulate carbon settles, the gasket 142 expands to fill any void between the media 64 and the lid 141.

In use, second element 54 is secured within air cleaner 20 with aperture 125 (FIG. 6) circumscribing outlet conduit 28 (FIG. 3). As a result of the use of appropriate sealing, via a variety of possible manners, for designs such as the one shown in the FIGS., airflow is inhibited from reaching the aperture 125 without filtering through the media 64.

Figure 6:
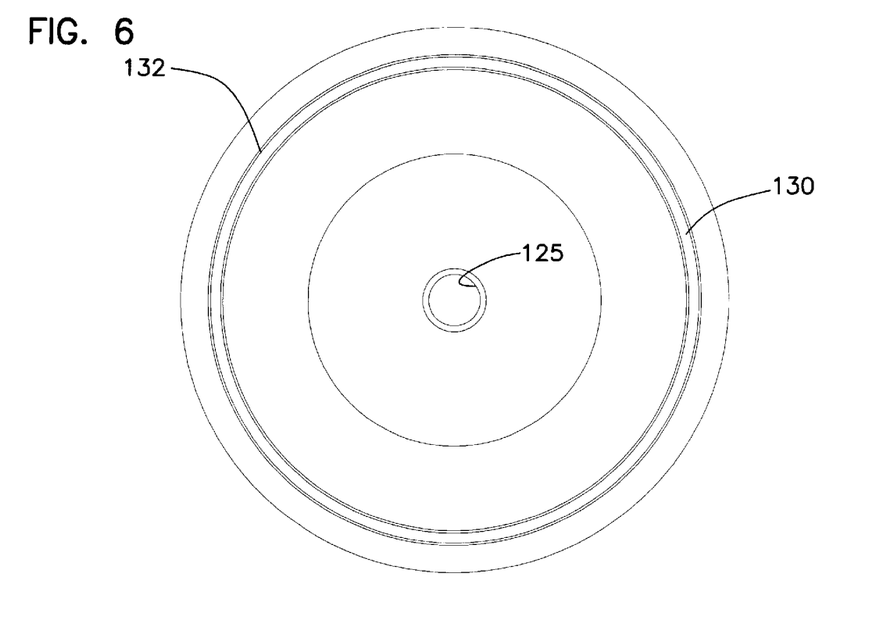
FIG. 6 is a bottom plan view of the element assembly depicted in FIGS. 4 and 5, and showing an outlet conduit and a gasket member, in accordance with principles of the present invention.

Attention is directed to FIG. 6. In FIG. 6, a bottom plan view of the element assembly 50 is shown. Specifically, one preferred bottom plan view of the second element 54 is illustrated as including an axial sealing system. The axial sealing system includes a gasket member 130 surrounding or circumscribing the outlet aperture 125. Preferably, the gasket member 130 is a soft, compressible O-ring 132. When the element assembly 50 is mounted within the housing 45 and the cover 47 is clamped in place with clamps 32 (FIG. 3) in order to provide axial pressure, the gasket member 130 provides a seal 136 (FIG. 3) between the wall of the housing 45 and the second element 54.

It can be seen, then, that the particular preferred element assembly 50 illustrated comprises first and second elements 52, 54 that flow in opposite directions to each other. For example, the first element 52 operates to have airflow from the interior to the exterior, or a "reverse flow" system as shown by arrows 147, FIG. 3. This is in contrast with the second element 54, where the airflow is from the exterior of the element 54 to the interior 58, or a "forward-flow" system as shown by arrows 148, FIG. 3. This helps to provide for more uniform loading. For example, if certain portions of the first element 52 start to load or become occluded, it does not affect any particular portions of the second element 54 in its load.

Attention is directed to FIG. 10. In FIG. 10, first element 200 has been modified from first element 52 depicted in FIGS. 3–5. First element 200 does not include a gasket member such as gasket member 106 for creating an axial seal. First element 200 includes an adapter ring construction 202. Adapter ring construction 202 is oriented between inner liner 204 and the inlet conduit 218. One usable adapter ring construction is described in commonly assigned U.S. patent application Ser. No. 09/025,828 filed Feb. 19, 1998, pending, hereby incorporated by reference. In general, adapter ring construction 202 comprises a circular member with feet 222 engaging or hooking onto the inner liner 204; an inner angled portion or surface 224; and a neck or end portion 206. As can be seen in FIG. 10, angled surface 224 extends between feet 222 and end portion 206. End portion 206 can be a generally cylindrical member with a circular cross-section defining an inner radial surface 225.

Still in reference to FIG. 10, first element 200 has a first end cap 210. As with the first end cap 95 of the FIG. 3 embodiment, the first end cap 210 defines an airflow aperture 212 therethrough. In contrast to the first end cap 95, the first end cap 210 in the FIG. 10 embodiment is constructed of a soft, compressible material such that sealing portion 215 is compressed between and against the airflow inlet conduit 218 and the end portion 206 of the ring construction 202. One usable material for first end cap 210 is a compressible, polymeric material, such as polyurethane, more specifically, foamed polyurethane. One usable material is described in commonly assigned U.S. Pat. No. 5,669,949 for end cap 3, hereby incorporated by reference. As can be seen in FIG. 10, the sealing portion 215 circumscribes the aperture 212. In this manner, when the inlet conduit 218 is positioned within the aperture 212, the sealing portion 215 is compressed between and against the conduit 218 and the end portion 206 to form a radial seal 220 therebetween. Other structural features of the FIG. 10 embodiment are analogous to and are as described herein with respect to the embodiments of FIGS. 1–9.

Figure 11:
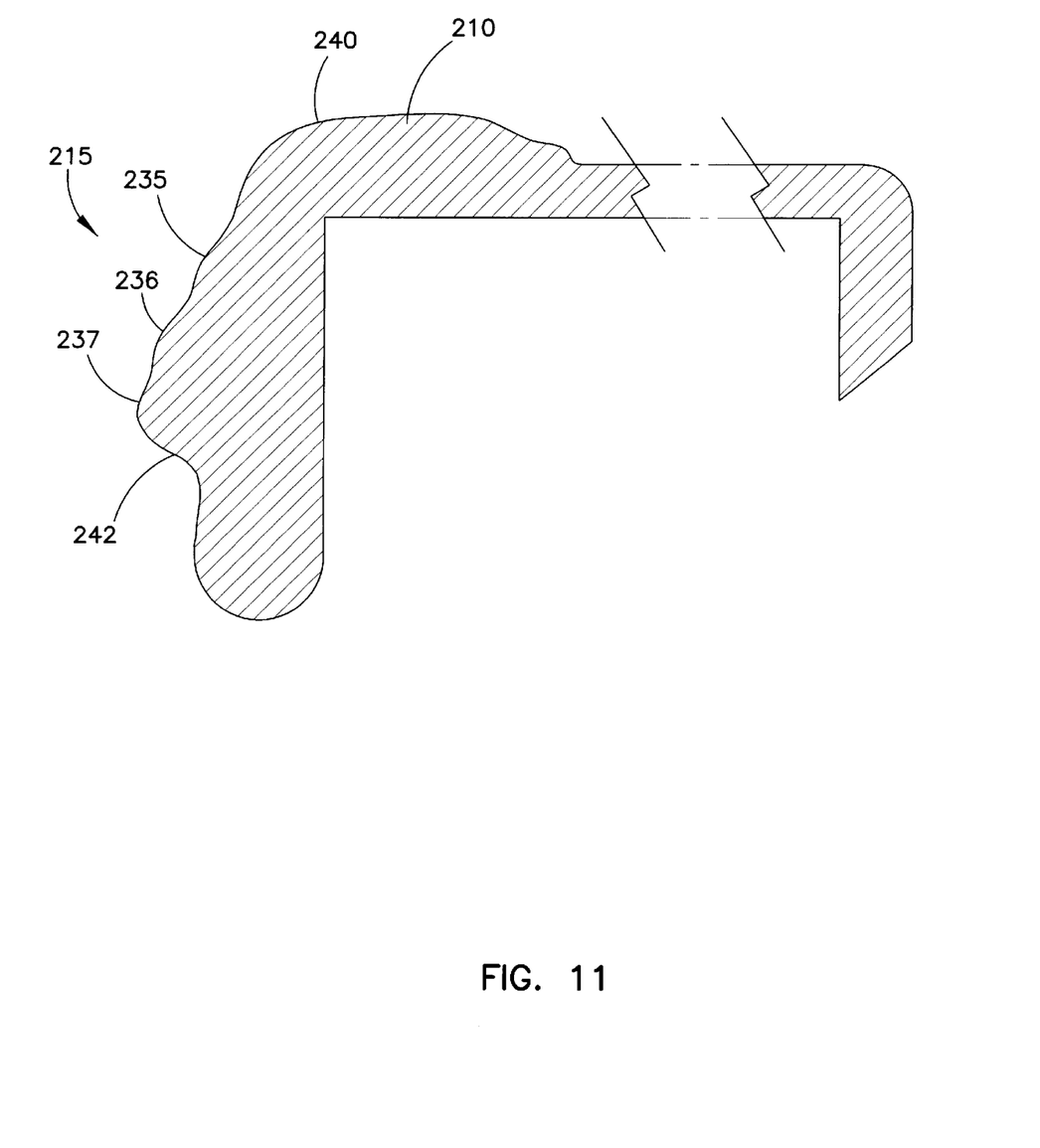
FIG. 11 is a fragmented, cross-sectional view depicting an end cap sealing area profile for the radial sealing system used in the arrangement of FIG. 10.

In reference now to FIG. 11, a fragmented, cross-sectional view of the first end cap 210 of the FIG. 10 embodiment is shown, in an uncompressed state. That is, radial sealing portion 215 is shown when the filter element 200 is not installed in the air cleaner housing and over the tube or conduit 218. Still referring to FIG. 11, radial sealing portion 215 defines a gradient of increasing internal diameters of surfaces for interfacing with the airflow conduit 218. Specifically, in the example shown in FIG. 11, radial sealing portion 215 defines 3 steps, 235, 236, and 237. The cross-sectional dimension or width of the steps increases the further the step is from a top portion 240 of the first end cap 210. As shown, below step 237, there is a region 242 of decreased cross-sectional width.

C. Housing 45

Attention is now directed to FIG. 2. In FIG. 2, one preferred housing 45 is illustrated. Preferably, housing 45 is cylindrical with cylindrical body 46 and cover member 47.

Referring now to FIG. 3, housing body 46 preferably includes a surrounding wall 150 and an axial bottom wall 152. Bottom wall 152 provides a closed end to the wall 150. Bottom wall 152 preferably includes outlet conduit 28 extending and projecting therefrom, in order to provide airflow communication with the interior 58 of the second element 54.

Opposite of the bottom wall 152 is an open end 154 of the housing 45. The open end 154 is selectively opened and closed or covered and uncovered by the cover member 47. The cover member 47 is preferably mounted on the housing body 46 to be selectively either latched thereon or completely removable therefrom.

Preferably, and in reference now to FIG. 2, the cover member 47 is selectively mounted over the open end 154 by clamps 32. Clamps 32 preferably comprise over-center clamps evenly spaced around the outer periphery 156 of the housing body open end 154. The over-center clamps 32 are preferably spring metal clamps and can be those described in U.S. application Ser. No. 08/751,041, pending commonly assigned hereto, and incorporated herein by reference.

The arrangement shown preferably utilizes 3–8 clamps, and in this embodiment, four clamps 32, evenly spaced about the periphery of the body 46 and cover 47. Together, the clamps 32 provide a compressive force of at least 15 lbs., and typically about 17–20 lbs. This is to provide sufficient axial pressure on the element assembly 50 in order to provide air tight seals 110, 136 between the element assembly 50 and the housing 45.

In reference now to FIG. 3, housing 45 preferably includes structure for centering the element assembly 50 therein. In the particular preferred embodiment illustrated, housing 45 includes a plurality of projection members or standoffs 160 in axial extension from the bottom wall 152 of the housing body 46. In general, the standoffs 160 preferably comprise upright columns 162 extending from the bottom wall 152. Each of columns 162 preferably defines a bevel or tapered surface or portion 164, that helps provide a centering function. That is, because of the nature of bevel or tapered portion 164, there is a leading edge that leads the element assembly 50 into the proper orientation within the housing 45. Preferably, projecting outwardly from columns 162 are feet 165. Feet 165 hold and support the element assembly 50 when it is oriented within the housing 45. Preferably, the height of the feet 165 is set to affect only partial compression of the gasket member 130. In preferred arrangements, the height of the feet 165 is such that the compression of the gasket member 130 is no greater than 75% and typically about 50%. In other words, one of the advantages of feet 165 is that they prevent compression set in the gasket member 130 and ensure that the upper gasket member 106 has sufficient compression to form seal 110, in the axial seal arrangement. Preferably, the height of the feet 165, that is, the distance from the bottom 152 to the top of each foot 165, is preferably about 0.2 inches, and in one example, 0.19 inches. For a gasket member 130 having a cross-sectional thickness of about ⅜ in., a height of feet 165 of about 0.19 inches leads to a compression of gasket member 130 of about 50%.

Figure 8:
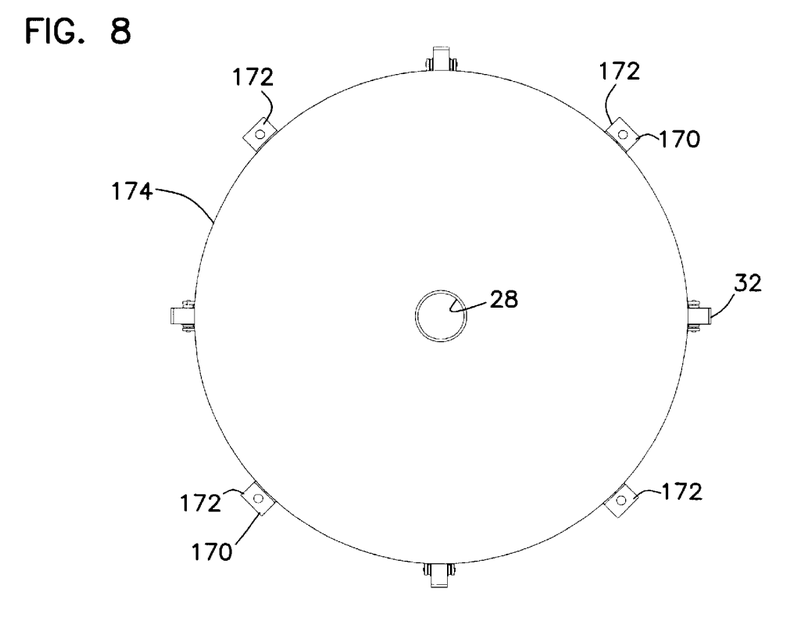
FIG. 8 is a bottom plan view of the air cleaner depicted in FIG. 7, and showing mounting structure, according to principles of the present invention.

Preferably, the housing 45 includes structure for mounting the housing 45 to supporting structure. The supporting structure can include a variety of arrangements, such as a plate. In FIG. 8, one example of preferred mounting structure is shown. Preferably, the mounting structure includes a bolt circle with a plurality of mounting locations 170. Mounting locations 170 preferably include clips or flanged nuts 172 with internal threads for accepting threaded bolts therein. Nuts 172 are suitably attached to housing 45 through means such as welding. Preferably, the mounting locations 170 are evenly spaced about the periphery 174 of the bottom wall 152. In the preferred embodiment shown in FIG. 8, there are four mounting locations 170 spaced about 90° apart.

D. Methods of Determining Filter Replacement and of Servicing

Figure 7:
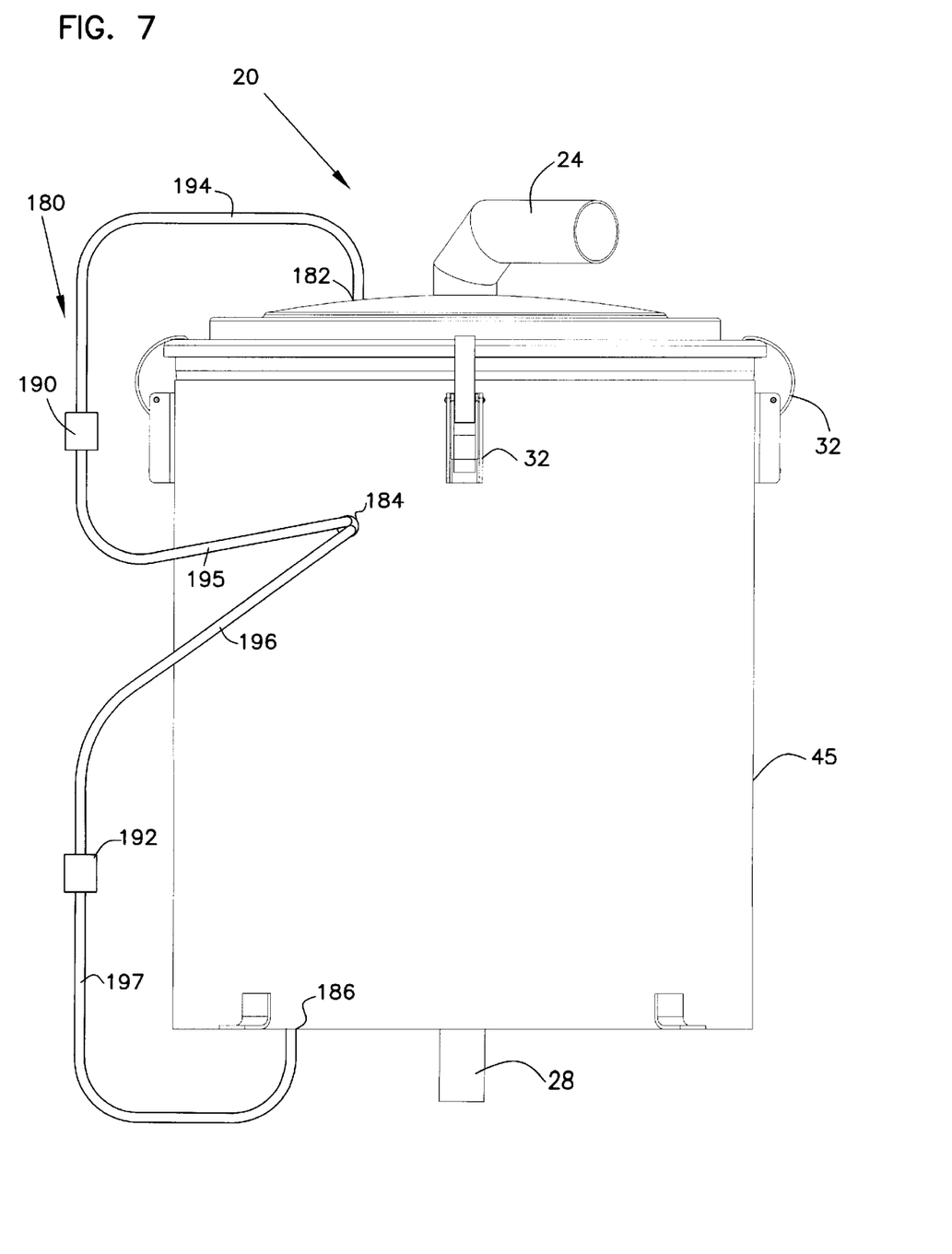
FIG. 7 is a side elevational view of the air cleaner depicted in FIG. 2, and schematically depicting pressure differential switches, according to principles of the present invention.

The preferred air cleaner 20 includes a way of communicating that the element assembly 50 requires service or change out. Attention is directed to FIG. 7. In FIG. 7, one preferred system for indicating when change out is needed and for indicating whether or not the filter element assembly 50 is installed in the housing or not is shown generally at 180.

In FIG. 7, system 180 preferably includes a pressure tap 182 upstream of the first filter element 52. A second pressure tap 184 preferably is provided just downstream of the first element 52, but upstream of the second element 54. A third pressure tap 186 preferably is provided downstream of the second element 54. In general, pressure taps 182, 184, 186 preferably include apertures in the housing 45, about ⅛ in. national pipe thread with a barbed brass hose fitting for accommodating hoses 194, 195, 196, 197.

Preferably, oriented between the first pressure tap 182 and second pressure tap 184 is a differential pressure switch 190. Differential pressure switch 190 indicates the pressure drop across the first element 52. Preferably, between the second pressure tap 184 and third pressure tap 186 is a second pressure differential switch 192. Second differential pressure switch 192 indicates the pressure drop across the second element 54. Usable switches can be part No. MPL-502 commercially available from Micro-Pneumatics Logic Inc. of Fort Lauderdale, Fla.

The reading of the pressure differential switch 190 indicates when the filter assembly 50 needs to be replaced. Specifically, the pressure drop across the particulate filter 52 will increase as the media 60 becomes loaded. Once the pressure drop exceeds a set value on the switch 190, the switch will close indicating the need to change the element assembly 50.

The pressure differential switch 192 will indicate the presence or absence of the filter assembly 50 and/or a blockage of flow through the entire system. For example, if the inlet hose 22 or outlet hose 30 (FIG. 1) becomes blocked, or if the blower 16 stops working, this will be indicated by the second differential pressure switch 192. Specifically, the pressure drop across the second element 54 will be above a minimum value if the filter assembly 50 is present, and there is airflow. The pressure switch 192 will be closed if the filter assembly 50 is installed, and there is airflow through the system.

When it is time to change the element assembly 50, for example, when the differential pressure switch 190 indicates that it is time to change due to the loaded particulate filter element 52, the arrangement described herein lends itself to convenient and quick change out. Preferably, change out is conducted every one or two weeks, with an estimated 2.25 pounds of particulate captured in the first element 52. Preferably, the life of the noxious gas capturing second element 54 exceeds the life of the particulate filter element 52.

To change out the element assembly 50, the following steps are preferably performed. The cover 47 is removed from the housing 45. Preferably, this is by unlatching the clamps 32. When the cover 47 is unclamped from the body 46, the seals 110, 136 between the element assembly 50 and the housing 45 are broken. By removing the cover 47, the first end cap 95 of the first element 52 is exposed. The person performing the change out then grasps the handle 75 secured to the element assembly 50. The handle 75 is pivoted away from the end cap 95 and the element assembly 50 is lifted through the open end 154. First, the first element 52 passes through the open end 154, followed by the second element 54.

The old, spent element assembly 50 is discarded. In some instances, it may be desirable to recycle certain particulates captured in the first element 52.

The collected particulate material within the first element 52 stays within the interior of the first element 52 and does not have an opportunity or access to a hole to fall out from the interior 56.

A second, different, new filter assembly 50 is then provided. The person grasps the handle 75 of the new element assembly 50 and positions it within the housing 45. Specifically, the second element 54 passes through the open end 154, followed by the first element 52. The standoffs 160 help to center the element assembly 50 centering the second end cap 121 on the bottom wall 152 of the housing 45. The airflow aperture 125 in the second end cap 121 is placed in airflow communication with the outlet conduit 28. The cover 47 is then oriented to close the open end 154, as it is placed over the end of the element assembly 50. The inlet conduit 24 is placed in airflow communication with the airflow aperture 100 of the first end cap 95.

The clamps 32 are then latched in order to secure the cover 47 to the body 46. As the clamps are closed or tightened over center, axial pressure is applied between the element assembly 50 and the housing 45. The axial pressure causes an air tight seal 110 between the gasket member 106 and the cover 47, and creates the seal 136 between the gasket member 130 and the bottom wall 152.

In preferred systems, the total time to perform the change out of the element assembly 50 is less than five minutes, and preferably less than three minutes.

E. Example materials

The following section provides examples of typical, and in certain instances, preferred materials for the arrangements herein. It is understood, of course, that alternative materials may be utilized if appropriate.

Housing 45 is preferably constructed from metal, for example steel, having a thickness of 0.044 inches.

The end caps 95, 96 and 120, 121 may comprise metal, for example galvanized steel, 0.044 inch thick.

O-rings 107 and 132 and gasket member 142 may be constructed from rubber, for example neoprene/EPDM/SBR sponge rubber. These have a compression of about 25% deflection at 2–5 psi, and a hardness of about 30–45 shore. They have a density of 5–7 lbs./cu. ft., and a tensile strength of 80 psi. They operate within a temperature range of −70° to +250° F.

Media 60 may comprise a pleated media, or alternatively, a depth media. If pleated media is used, in general, paper or cellulose fiber media or media comprising cellulose fibers and synthetic fibers can be used. The media may be treated, for example, with oiling as described in U.S. Pat. No. 5,423,892 incorporated herein by reference. Or, for example, the media may be treated with expanded polytetrafluoroethylene (PTFE). Also, as explained in U.S. Pat. No. 5,423,892, incorporated herein by reference, the efficiency of barrier media such as paper or cellulose can be modified in some instances by applying to a surface of the media a deposit of relatively fine fibers, typically less than five microns and in many instances submicron sized (average) fibers.

One preferred media 60 includes a flame retardant air filter medium. This medium has the following properties:

Frazier permeability of about 50 ft/m minimum, and an expected value of 16–18 ft./m.

Dry breaking strength of at least 8 pounds, and expected values of about 9–14 pounds.

Wet breaking strength of at least 4.5 pounds, and expected values of about 5–18 pounds.

Basis weight of no greater than 80 lbs./3,000 ft$^2$, and expected values of about 74–79 lbs./3,000 ft.$^2$.

Wet bursting strength of at least 10 psi, and expected values of about 18 psi.

Pore size no greater than about 55 micrometers, and typically about 48–53 micrometers Corrugation of at least 0.020 inches, and typically about 0.021 inches.

Thickness of at least 0.012 inches, and typically about 0.013–0.015 inches.

Dry tea of at least 25 J/sq. and typically at least 30 J/sq.

Dust loading of at least 14.9 g/sq. ft. at 8 feet per minute, and typically about 16.7 g/sq. ft.

A gurley stiffness of at least 2,000 mg., and typically at least 2,400 mg.

Flame retardance of no more than five inches maximum char length and typically about 2–4 inches.

Media 64 preferably is an activated carbon impregnated with potassium iodide, for absorbing the formaldehyde gases. If only odor absorption is needed (and formaldehyde gas absorption is not needed), then the activated carbon need not be impregnated with potassium iodide. Media 64 preferably has the following specifications:

$CCl_4$ activity level, according to ASTM D-3467 of at least 55% (base).

Moisture content according to ASTM D-2867 of no greater than about 15–22%.

Particle size according to ASTM D-2862 of 6×12 U.S. mesh.

The medium 64 preferably has a hardness according to ASTM D-3892 of 97. It has bulk density according to ASTM D-2854 of 0.60 g/cm$^3$. It has an ash content according to ASTM D-2866 of 3% (base). It has a surface area, BET $N_2$ of 1150 m$^2$/g (base). Media 64 typically is coarse, granular particles, about 1/16 in. average diameter.

In operation, the media 64 will remove the formaldehyde gas, such that downstream of the air cleaner 20, there will be less than 0.1 parts per million formaldehyde in the air.

One preferred activated carbon is commercially available from Barnebey & Sutcliffe of Columbus, Ohio, under the tradename FormaSorb®.

Media-containing inner and outer liners 114, 115 may typically be an electrostatic felt of needled, mixed fibers (50% polypropylene and 50% modacrylic) with the following properties:

Fomblin efficiency: 76–94% average with no single value below 71 or above 99, tested at 10.5 feet per minute airflow; 0.3–0.4 micron particles.

Permeability: 283–476 feet per minute (86–145 meters per minute)

Thickness at 0.5 psi: 0.036–0.061 inches (0.91–1.55 millimeters)

Basis weight: 48–75 pounds per 3,000 square feet (78–122 grams per square meter)

F. One Example Construction

In the following paragraphs, one specific preferred example of an air cleaner assembly is described. It is understood, of course, that alternative constructions and dimensions may be utilized.

In operation, the air cleaner 20 would remove an estimated 2.25 pounds of particulate after operating for about one or two weeks. The minimum airflow rate would be about 30 ft.$^3$/m, and the maximum airflow rate through the cleaner 20 would be about 85 ft.$^3$/m.

The axial length between the end tip of the inlet conduit 24 and the outlet conduit 28 would be at least about 20 in., and typically would be about 25 inches. The diameter of the inlet conduit 24 would be at least about 1 in., no greater than about 4 in., and typically about 1.75 inches. The diameter of the housing body 46 would be at least about 12 in., no greater than about 24 in., and typically about 16 inches. The axial length of the outlet conduit 28 would be at least about 1 in., no greater than about 4 in., and typically about 1.9 inches. The outlet conduit 28 would have a diameter at least about 1 in., no greater than about 4 in., and typically about 1.25 inches.

The element assembly 50 would have an overall axial length of at least about 12 in., no greater than about 25 in., and typically about 19.3 inches. The axial length of the first element 52 would be at least about 10 in., no greater than about 20 in., and typically about 16.2 inches. The axial length of the second element 54 would be at least about 1 in., no greater than about 10 in., and typically about 3.1 inches. The inner diameter of the first and second elements 52, 54 would be at least about 5 in., no greater than about 12 in., and typically about 9.75 inches. The radial thickness of the media constructions 60 and 64 would be typically be at least about 1 in., no greater than about 4 in., and typically about 2 inches. The outer diameter of the element assembly 50 would be at least about 7 in., no greater than about 20 in., and typically about 13.75 inches. The diameter of the aperture 100 in the first end cap 120 would be at least about 1.25 in., no greater than about 4.25 in., and typically about 2.0 inches. The diameter of the outlet aperture 125 in the second end cap 121 would be at least about 1.25 in., no greater than about 4.25 in., and typically about 2.0 inches.

The inner diameter of the gasket member 100 would be at least about 11 and ⅛ in., no greater than about 13.5 in., and typically about 11.75 in. The gasket 100 would typically have a radial thickness of at least about 0.25 in., no greater than about 1.25 in., and typically about 0.75 in. It would have a cross-sectional thickness of at least about 0.25 in., no greater than about 0.5 in., and typically about ⅜ in.

The gasket member 130 would have dimensions similar to those for gasket member 100.

The standoffs 160 would typically project at least 0.1 in., no greater than about 2 in., and typically about 3/16 in. away from the bottom wall 152.

The above specification, examples and data provide a complete description of the manufacture and use of the invention. Many embodiments of the invention can be made without departing from the spirit and scope of the invention.

We claim:

1. A filter element arrangement comprising:
    (a) a first media construction; said first media construction having first and second opposite end caps and defining an open filter interior;
        (i) said first end cap having a gas flow aperture in gas flow communication with said open filter interior;
        (ii) said second end cap being closed to gas flow therethrough;
        (iii) said first media construction comprising pleated paper;
    (b) a first gasket member on said first media construction first end cap circumscribing said first media construction first end cap gas flow aperture;
    (c) a second media construction; said second media construction having first and second opposite end caps and defining an open filter interior;
        (i) said second media construction being secured to and stacked in axial alignment with said first media construction;
        (ii) said second media construction first end cap being closed to gas flow therethrough;
        (iii) said second media construction second end cap having a gas flow aperture in gas flow communication with said second media construction open filter interior; said second media second end cap being at an end of the filter element arrangement opposite of said first media construction first end cap;
        (iv) said second media construction comprising activated carbon;
        (v) said second media construction having a first outer liner and a first inner liner extending between said second media construction first and second end caps;
            (A) said first outer liner and first inner liner each having crimped portions;
        (vi) said second media construction having a packing construction including a plate and a packing member;
            (A) said plate being adjacent to said crimped portions; said crimped portions being between said plate and said second media construction first end cap;
                (1) said plate comprising a nonporous material;
            (B) said packing member being oriented between and against said plate and said activated carbon;
                (1) said packing member comprising a soft, compressible material; and
    (d) a second gasket member on said second media construction second end cap circumscribing said second media construction second end cap gas flow aperture.

2. A filter element arrangement according to claim 1 wherein:
    (a) said second media construction first end cap is adjacent to said first media construction second end cap.

3. A filter element arrangement according to claim 2 wherein:
    (a) said first media construction is secured to said second media construction by spot welds between said second media construction first end cap and said first media construction second end cap.

4. A filter element arrangement according to claim 1 wherein:
    (a) said first media construction is cylindrical with an outer liner and an inner liner extending between said first media construction first and second end caps; and
    (b) said second media construction is cylindrical.

5. A filter element arrangement according to claim 4 wherein:
    (a) said second media construction further includes a second inner liner adjacent to said second media construction first inner liner; and a second outer liner adjacent to said second media construction first outer liner.

6. A filter element arrangement according to claim 5 wherein:
    (a) said second inner liner and said second outer liner each comprises felt.

7. A filter element arrangement according to claim 6 wherein:
    (a) said second inner liner and said second outer liner each includes crimped portions adjacent to said plate.

8. A filter element arrangement according to claim 1 further including:
    (a) a handle operatively secured to said first media construction first end cap.

9. An air cleaner arrangement comprising:
    (a) a housing having an interior, an inlet conduit, and an outlet conduit;
        (i) said inlet conduit constructed and arranged to intake gas flow into said housing;
        (ii) said outlet conduit constructed and arranged to exhaust gas flow from said housing;

(b) a removable and replaceable element assembly; said element assembly including:
 (i) a first filter element oriented within said housing interior; said first filter element having an open filter interior, a media pack, and first and second end caps at opposite ends of said media pack;
  (A) said first end cap having an aperture providing gas flow communication between said housing inlet conduit and said first filter element interior;
   (1) said first end cap gas flow aperture being coaxially aligned with said inlet conduit;
  (B) said second end cap being closed;
  (C) said media pack comprising pleated paper;
 (ii) a first gasket member on said first filter element first end cap circumscribing said first end cap gas flow aperture;
  (A) said first gasket member forming a seal with said housing to ensure gas flow through said inlet conduit is directed into said first filter element interior;
 (iii) a second filter element oriented within said housing interior; said second filter element having an open filter interior, a media pack, and first and second end caps at opposite ends of said second filter element media pack;
  (A) said second filter element being secured to and stacked in axial alignment with said first filter element;
  (B) said second filter element first end cap being closed;
  (C) said second filter element second end cap having an aperture providing gas flow communication between said second filter element interior and said housing outlet conduit;
  (D) said second filter element media pack comprising activated carbon;
 (iv) a second gasket member on said second filter element second end cap circumscribing said outlet conduit;
  (A) said second gasket member forming a seal between said second filter element and said housing; and
(c) a blower assembly directing gas flow through said inlet conduit, into said first element interior, through said first element media pack, through said second element media pack, into said second element interior, and out through said outlet conduit.

10. An air cleaner arrangement according to claim 9 wherein:
(a) said housing includes a plurality of standoffs along an interior wall of said housing;
 (i) said standoffs circumscribing and being adjacent to said outlet conduit; and
 (ii) said second filter element being centered between said standoffs.

11. An air cleaner arrangement according to claim 9 wherein:
(a) said housing includes a removable cover providing access to said housing interior and said element assembly.

12. An air cleaner arrangement according to claim 11 wherein:
(a) said housing includes a plurality of clamps for selectively securing said cover to said housing.

13. An air cleaner arrangement according to claim 11 wherein:
(a) said element assembly includes a handle operably secured thereto for orienting and removing said element assembly within said housing.

14. An air cleaner arrangement according to claim 11 wherein:
(a) said second filter element has a first outer liner and a first inner liner extending between said second filter element first and second end caps;
 (i) said first outer liner and first inner liner each having crimped portions;
(b) said second filter element includes a packing construction having a plate and a packing member;
 (i) said plate being adjacent to said crimped portions; said crimped portions being between said plate and said second filter element first end cap;
  (A) said plate comprising a nonporous material;
 (ii) said packing member being oriented between and against said plate and said activated carbon; and
  (B) said packing member comprising a soft, compressible material.

15. An air cleaner arrangement according to claim 14 wherein:
(a) said second filter element further includes a second inner liner adjacent to said second filter element first inner liner; and a second outer liner adjacent to said second filter element first outer liner;
(b) said second inner liner and said second outer liner each includes crimped portions adjacent to said plate.

16. An air cleaner arrangement according to claim 9 including:
(a) a first pressure tap upstream of said first filter element; a second pressure tap downstream of said first filter element and upstream of said second filter element; and a third pressure tap downstream of said second filter element;
(b) a first differential pressure switch being connected to said first and second pressure taps to indicate a pressure drop across said first filter element; and
(c) a second differential pressure switch connected to said second and third pressure taps to indicate a pressure drop across said second filter element.

17. A method for changing a filter element assembly comprising steps of:
(a) removing a housing cover to expose an opening to an interior of the housing; an element assembly being oriented in the housing interior;
(b) grasping a handle on the element assembly; the element assembly including:
 (i) a first media construction; the first media construction having first and second opposite end caps and defining an open filter interior;
  (A) the first end cap having a gas flow aperture in gas flow communication with the open filter interior;
  (B) the second end cap being closed to gas flow therethrough;
  (C) the first media construction comprising pleated paper;
 (ii) a first gasket member on the first media construction first end cap circumscribing the first media construction first end cap gas flow aperture;
 (iii) a second media construction; the second media construction having first and second opposite end caps and defining an open filter interior;
  (A) the second media construction being secured to and stacked in axial alignment with the first media construction;
  (B) the second media construction first end cap being closed to gas flow therethrough;
  (C) the second media construction second end cap having a gas flow aperture in gas flow communication with the second media construction open filter interior; the second media second end cap being at an end of the filter element arrangement opposite of the first media construction first end cap;

(D) the second media construction comprising activated carbon;

(E) the second media construction having a first outer liner and a first inner liner extending between the second media construction first and second end caps;

(1) the first outer liner and first inner liner each having crimped portions;

(F) the second media construction having a packing construction including a plate and a packing member;

(1) the plate being adjacent to the crimped portions; the crimped portions being between the plate and the second media construction first end cap;

(2) the plate comprising a nonporous material;

(3) the packing member being oriented between and against the plate and the activated carbon;

(4) the packing member comprising a soft, compressible material; and    (iv) a second gasket member on the second media construction second end cap circumscribing the second media construction second end cap gas flow aperture; and (c) lifting with the handle the element assembly through the opening.

18. A method according to claim 17 wherein:

(a) said step of removing a housing cover includes unlatching the housing cover from the housing.

19. A method according to claim 17 wherein:

(a) after said step of lifting, supplying a new element assembly, and inserting the new element assembly into the housing interior.

20. A method according to claim 19 wherein:

(a) after said step of inserting, latching the housing cover to the housing and forming a seal: (i) between the first gasket member and the housing cover; and (ii) between the second gasket member and the housing.

* * * * *